(12) United States Patent
Kurabayashi

(10) Patent No.: US 7,467,237 B2
(45) Date of Patent: Dec. 16, 2008

(54) DEVICE DRIVER AND RECORDING MEDIUM

(75) Inventor: Kazuhiro Kurabayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 502 days.

(21) Appl. No.: 11/338,731

(22) Filed: Jan. 25, 2006

(65) Prior Publication Data

US 2006/0170947 A1 Aug. 3, 2006

(30) Foreign Application Priority Data

Jan. 26, 2005 (JP) ............... 2005-017844

(51) Int. Cl.
*G06F 3/00* (2006.01)
*G06F 13/00* (2006.01)
(52) U.S. Cl. .............. 710/8; 710/104; 710/62; 710/74; 715/810
(58) Field of Classification Search .......... 710/8–10, 710/104, 62–64, 72–74; 701/208; 715/230, 715/810–846; 358/1.13–1.15
See application file for complete search history.

(56) References Cited

U.S. PATENT DOCUMENTS 6,993,724 B2 * 1/2006 Minagawa ............ 715/810

2004/0039523 A1 * 2/2004 Kainuma et al. ......... 701/208
2004/0060010 A1 * 3/2004 Bright et al. ............ 715/526

FOREIGN PATENT DOCUMENTS

JP 2003-216374 7/2003
JP 2003-330653 11/2003

* cited by examiner

*Primary Examiner*—Christopher B Shin
(74) *Attorney, Agent, or Firm*—John A. Castellano; Harness, Dickey & Pierce, P.L.C.

(57) ABSTRACT

A device driver is disclosed which is used in a computer connected to a device. The computer includes an input unit, a display unit, a storage unit and a processing unit. The storage unit stores a setup information file including an attribute value of a function of the device and a special setup flag. The device driver directs the processing unit to perform the steps of displaying the special setup screen on the display unit when the special setup flag is stored in the storage unit, receiving and storing the attribute value specified by the input unit in the setup information file, reading the attribute value by referring to the setup information file and displaying the default setting screen in response to the attribute value, and changing the special setup flag to prevent the special setup of the device driver.

4 Claims, 10 Drawing Sheets

FIG.3

SETUP INFORMATION FILE

| FUNCTION | ATTRIBUTE VALUE |
|---|---|
| RUN BY EXECUTING SETUP PROGRAM | No |
| LOCK PAPER FEED TRAY | No |
| POP-UP FOR ID INPUT | No |
| PAPER FEED TRAY | TRAY 1 |
| ⋮ | ⋮ |

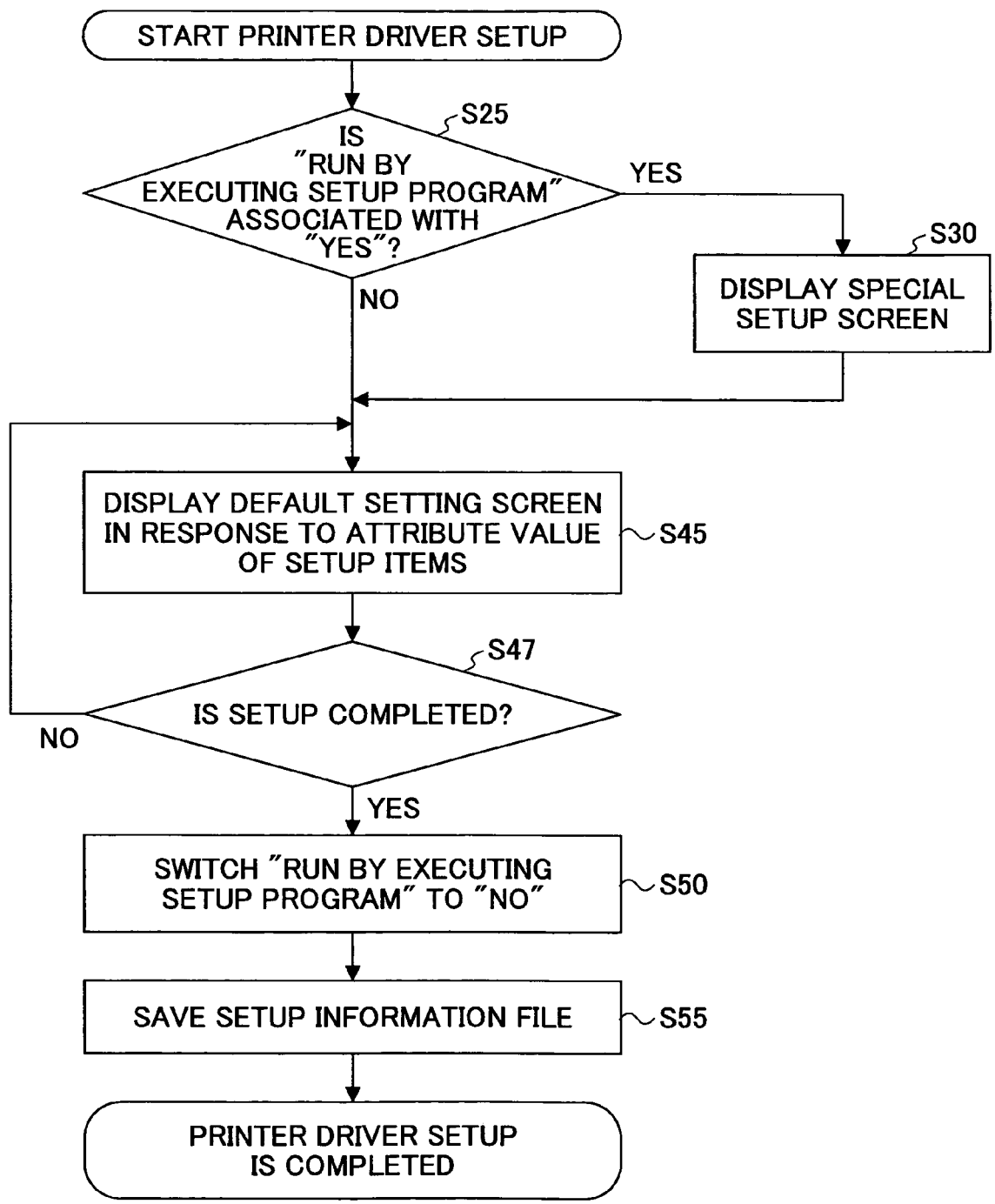

FIG.7A

SETUP INFORMATION FILE BEFORE
EXECUTING SETUP PROGRAM

| FUNCTION | ATTRIBUTE VALUE |
|---|---|
| RUN BY EXECUTING SETUP PROGRAM | No |
| LOCK PAPER FEED TRAY | No |
| POP-UP FOR ID INPUT | No |
| PAPER FEED TRAY | TRAY 1 |
| ⋮ | ⋮ |

FIG.7B

SETUP INFORMATION FILE AFTER
EXECUTING SETUP PROGRAM

| FUNCTION | ATTRIBUTE VALUE |
|---|---|
| RUN BY EXECUTING SETUP PROGRAM | Yes |
| LOCK PAPER FEED TRAY | No |
| POP-UP FOR ID INPUT | No |
| PAPER FEED TRAY | TRAY 1 |
| ⋮ | ⋮ |

FIG.7C

SETUP INFORMATION FILE AFTER
SETTING UP PAPER FEED TRAY TO BE
LOCKED ON SPECIAL SETUP SCREEN

| FUNCTION | ATTRIBUTE VALUE |
|---|---|
| RUN BY EXECUTING SETUP PROGRAM | Yes |
| LOCK PAPER FEED TRAY | Yes |
| POP-UP FOR ID INPUT | No |
| PAPER FEED TRAY | TRAY 1 |
| ⋮ | ⋮ |

FIG.7D

SETUP INFORMATION FILE AFTER DEFAULT
SETTING OF DEVICE DRIVER IS COMPLETED

| FUNCTION | ATTRIBUTE VALUE |
|---|---|
| RUN BY EXECUTING SETUP PROGRAM | No |
| LOCK PAPER FEED TRAY | Yes |
| POP-UP FOR ID INPUT | No |
| PAPER FEED TRAY | TRAY 1 |
| ⋮ | ⋮ |

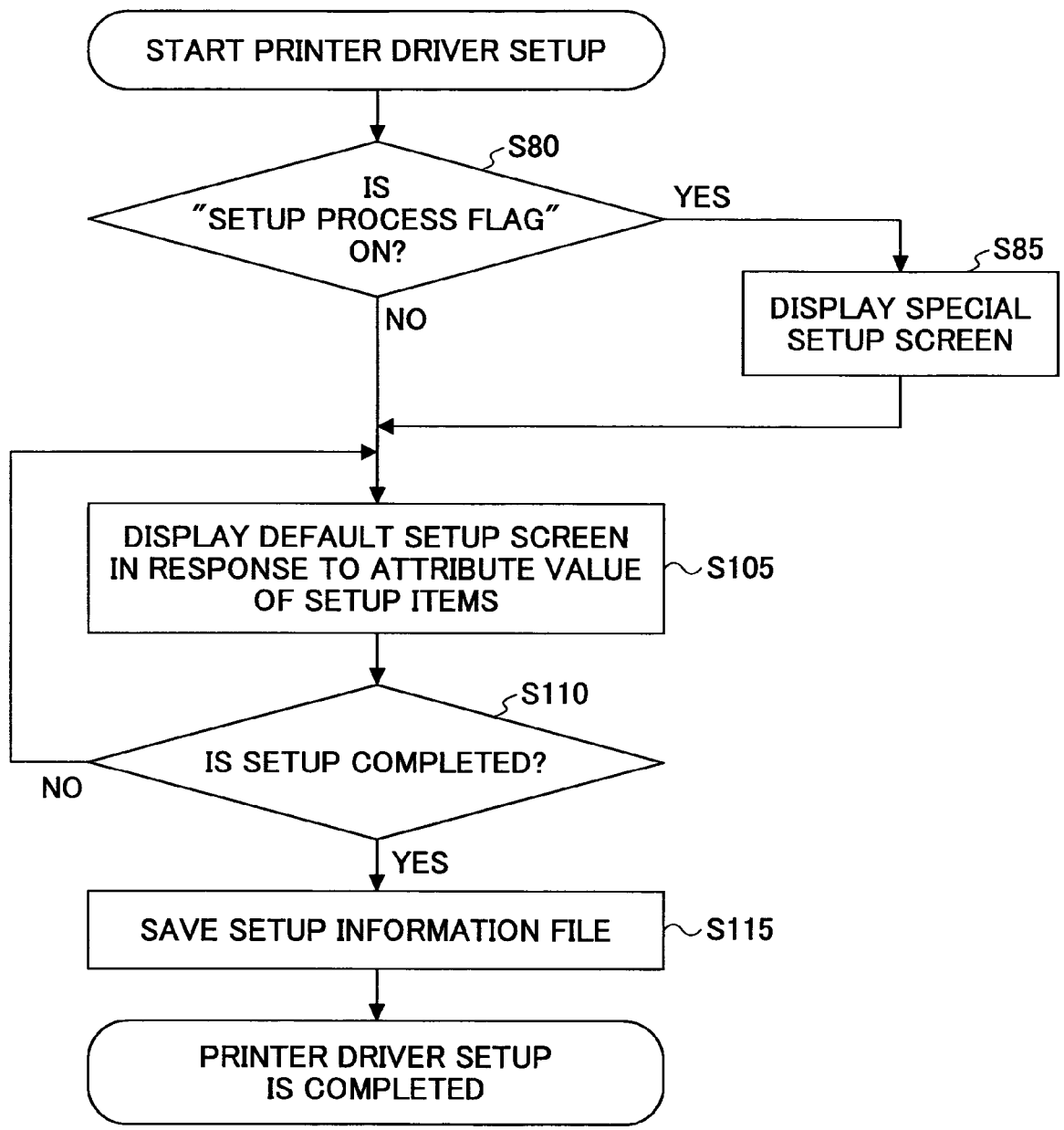

DEVICE DRIVER AND RECORDING MEDIUM

BACKGROUND OF THE INVENTION

1. Field of the Invention

The present invention generally relates to a device driver with a default setting that can be regulated separately from rights of users who use a computer including the device driver.

2. Description of the Related Art

The system administrators of the work place conventionally modify a printer driver as the device driver for suiting the users' environment in order that general users can use a printer as a device connected to a communication network. The printer driver is modified so as to regulate a function of the printer that the general users use according to their environment. Further, the modified printer driver is distributed to the general users by a recording medium or by installing the printer driver on a server in order to share the printer driver. Accordingly, the general users can use the printer by installing the printer driver on their respective computers.

On the other hand, when changing the function of the printer, it is necessary to modify the printer driver and direct the general users to reinstall the modified printer driver on their respective computers.

Referring to this, Japanese Laid-Open Patent Application Publication No.2003-330653 (hereinafter, referred to as Patent Document 1) discloses a printer driver enabling only the users having administrator rights to perform a default setting of the printer driver or enabling even general users to perform the default setting of the printer driver without reinstalling the modified printer driver. It should be noted that the default setting of the printer driver is to select an attribute value of the function of the printer to be used corresponding to the printer driver in advance.

However, the printer driver disclosed by Patent Document 1 cannot regulate the default setting of the printer driver separately from the right of the users who use the computers. Accordingly, in the above described computers, the users having the administrator rights such as "administrator", "root" and the like can consequently change the default setting of the printer driver freely. For example, in notebook PCs (personal computers) which general users personally own, there are many cases where the general users have administrator rights. Therefore, the general users can change the default setting of the above described printer driver freely. In order to prevent this, it is necessary for the system administrators of the work place to install the printer driver regulating the function of the printer which the general users use on each of the above notebook PCs.

Referring to this, Japanese Laid-Open Patent Application Publication No.2003-216374 (hereinafter, referred to as Patent Document 2) discloses a printer driver locking a user interface for performing the default setting of the printer driver by a predetermined locking file.

However, in the printer driver disclosed in Patent Document 2, when the shared printer driver stored in the server is installed on the computers which the users use, the locking file is not installed on the computers which the general users use. Since the locking file is different from a general setup information file storing setup information of the printer driver, an OS (operating system) of the server does not recognize the locking file as an indispensable file for the printer driver. Accordingly, the default setting of the printer driver of the server cannot be directly used by the computers which the general users use.

SUMMARY OF THE INVENTION

It is a general object of the present invention to provide a device driver that substantially obviates one or more problems caused by the limitations and disadvantages of the related art. It is another and more specific object of the present invention to provide a device driver in which the default setting of the printer driver is regulated separately from the right of the users who use the computers. The device driver stored in the server is shared so that the default setting of the device driver of the server can be directly used by the computers which the general users use when installing the device driver in the computers which the general users use.

To achieve these and other advantages in accordance with the purpose of the invention, the invention provides a device driver used in a computer connected to a device. The computer includes an input unit, a display unit, a storage unit and a processing unit. The processing unit is configured to control operations of the input unit, the display unit and the storage unit. The storage unit stores a setup information file and a special setup flag. The setup information file includes attribute values of setup items provided for selecting whether the setup items are to be displayed, are not to be displayed, or whether they are to be unchangeable, and an attribute value of a function of the device. The attribute values of the setup items and the attribute value of the function of the device are displayed on a default setting screen. The device driver directs the processing unit to perform the steps of displaying the special setup screen for setting up the attribute values of the setup items on the display unit when the special setup flag permitting a special setup of the device driver is stored in the storage unit, receiving the attribute values of the setup items specified by the input unit through the special setup screen, and storing the attribute values of the setup items in the setup information file. Moreover, the device driver directs the processing unit to perform the steps of reading the attribute values of the setup items by referring to the setup information file and displaying the default setting screen where the setup items are selected to be displayed, not to be displayed, or to be unchangeable in response to the corresponding attribute values of the setup items. Furthermore, the device driver directs the processing unit to perform a step of changing the special setup flag so that the special setup flag prevents the special setup of the device driver.

According to at least one of the embodiments of the present invention, as long as the special setup flag is stored in the storage unit, thereby permitting the special setup of the device driver, the default setting of the printer driver can be regulated separately from the right of the users who use the computers. The setup information file stores the attribute values of the setup items provided for selecting the status of the setup items to be displayed on the default setting screen, not to be displayed, or to be unchangeable. Accordingly, the device driver stored in the server is shared so that the default setting of the device driver stored in the server can be directly used by the computers used by the general users, when installing the device driver in the computers used by the general users.

BRIEF DESCRIPTION OF THE DRAWINGS

Other objects and further features of the present invention will become apparent from the following detailed description when read in conjunction with the accompanying drawings, in which:

FIG. 3 is a table illustrating a configuration of the setup information file;

FIG. 6 is a flowchart of the server executing a printer driver according to the first embodiment;

FIGS. 7A through 7D are tables illustrating changes of data stored in the setup information file;

FIG. 9 is a flowchart of the server executing a printer driver according to the second embodiment.

DESCRIPTION OF THE PREFERRED EMBODIMENTS

In the following, embodiments of the present invention are described with reference to the accompanying drawings.

Figure 1:
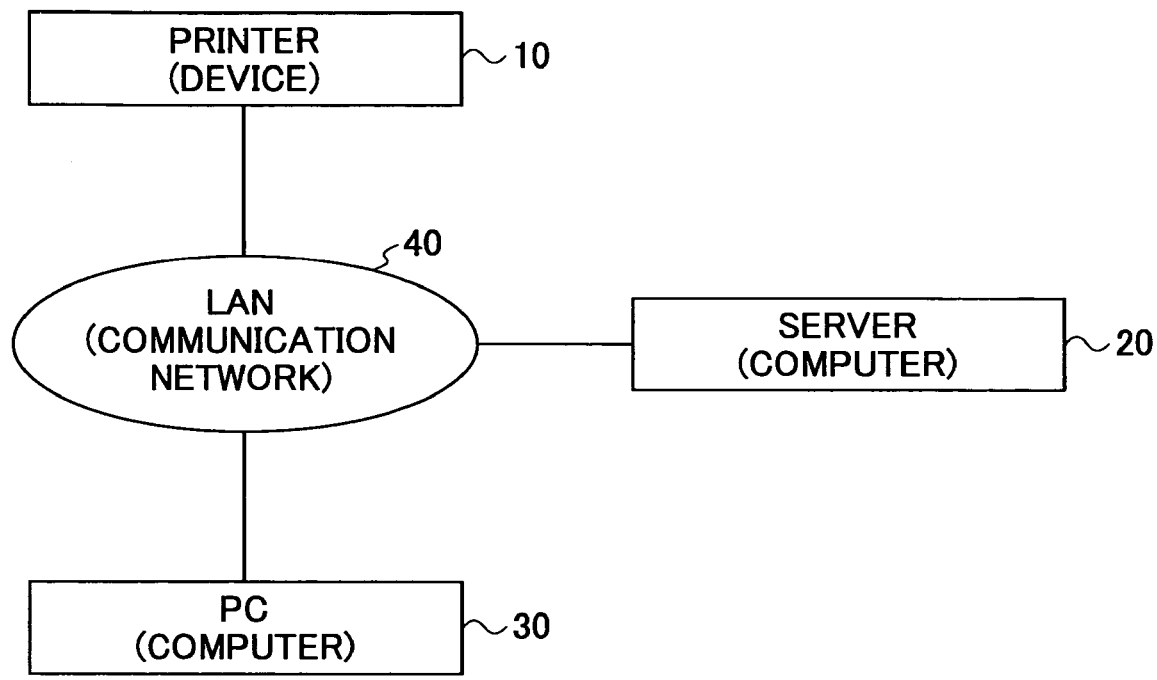
FIG. 1 is a block diagram showing the whole configuration of an embodiment of the present invention.

FIG. 1 is a block diagram illustrating the whole configuration according to a present embodiment.

A server 20 including a printer driver as a device driver to be shared, a printer 10 as a device, and a PC 30 for general users are connected to a LAN 40 (Local Area Network) as a communication network. It should be noted that the printer 10 is directly connected to the communication network in the present embodiment, but the printer 10 can be directly connected to computers such as the server 20.

The server 20 shares the printer driver as the device driver according to the present invention by a function of a general OS (Operating System). On the other hand, the printer driver shared by the server 20 is installed on the PC 30 via LAN 40 by a function of a general OS. Accordingly, the general users can print desired data with the printer 10 by operating the PC 30.

Figure 2:
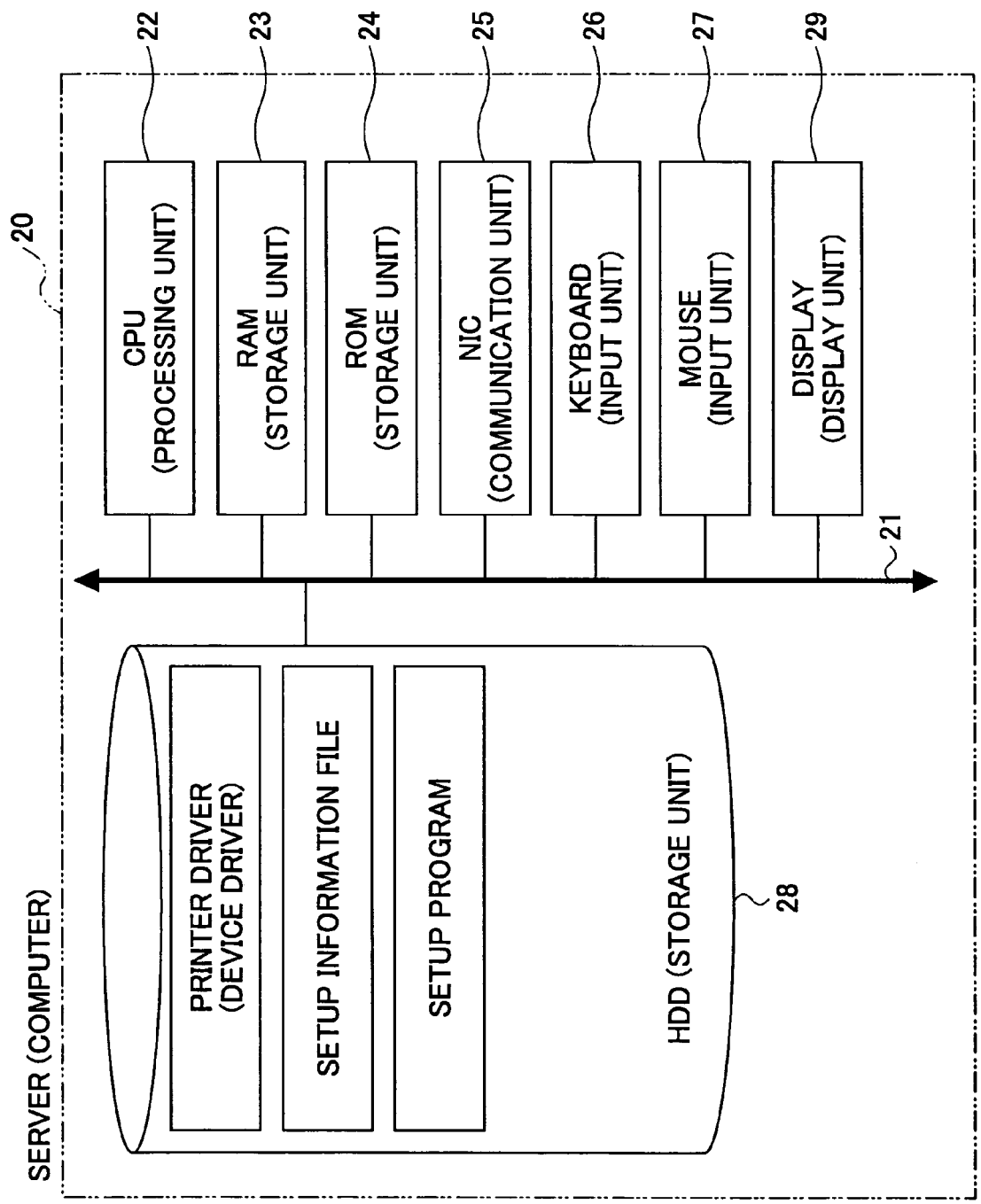
FIG. 2 is a schematic diagram of a server.

FIG. 2 is a schematic diagram of the server 20.

A CPU 22, a RAM 23, a ROM 24 and HDD 28 (Hard Disk Drive), a display 29, and a NIC 25 (Network Interface Card) are connected to a bus 21.

The HDD 28 stores the printer driver as the device driver according to an embodiment of the present invention, a setup information file including a default setting of the printer driver, and a setup program. The processing unit 22 of the server 20 can utilize the printer 10 by running the printer driver. In addition, the processing unit 22 of the server 20 can regulate functions of the printer 10 which users use by running the setup program. A detailed description is given below.

FIG. 3 is a table illustrating a configuration of the setup information file.

The setup information file stores special setup flags, attribute values indicating whether setup items are to be displayed, are not to be displayed, or are to be unchangeable on the default setting screen provided for setting up an attribute value of the function of the device, and the attribute value of the function of the device.

Referring to FIG. 3, "Run by executing setup program" and "No" as the special setup flags are associated with each other and stored in the setup information file. In the present embodiment, "Yes" associated with "Run by executing setup program" is a special setup flag permitting a special setup of the device driver. On the contrary, "No" associated with "Run by executing setup program" is another special setup flag preventing the special setup of the device driver.

Moreover, as shown in FIG. 3, "Lock paper feed tray" and "No" as an attribute value of the setup item are associated with each other and stored in the setup information file. The processing unit 22 of the server 20 enables changing the paper feed tray if "Lock paper feed tray" and "No" are associated with each other and stored in the setup information file. If "Lock paper feed tray" and "Yes" are associated with each other and stored in the setup information file, the tray is locked and prevented from being changed. Furthermore, as shown in FIG. 3, "Pop-up for ID input" and "No" as the attribute value of the setup item are associated with each other and stored in the setup information file. The processing unit of the server 20 does not display a pop-up for ID input when printing if "Pop-up for ID input" and "No" are associated with each other and stored in the setup information file. If "Pop-up for ID input" and "Yes" are associated with each other and stored in the setup information file, the pop-up for ID input is displayed when printing.

Further, as shown in FIG. 3, "paper feed tray" and "Tray 1" as an attribute value of a function of the device are associated with each other and stored in the setup information file. The processing unit of the server 20 performs printing on papers on the "Tray 1" if "paper feed tray" and "Tray 1" are associated with each other and stored in the setup information file.

Figure 4:
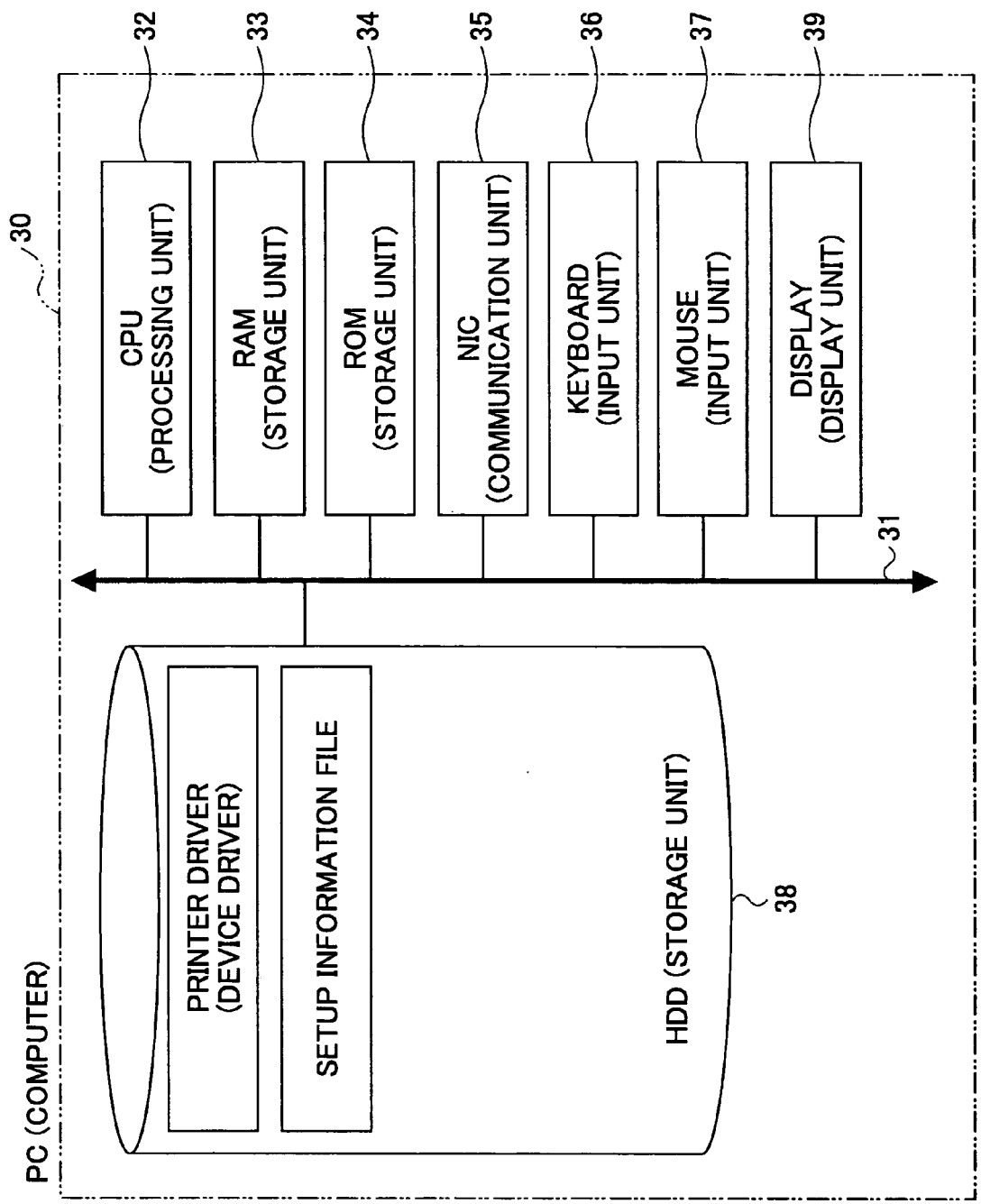
FIG. 4 is a schematic diagram of a PC.

FIG. 4 is a schematic diagram of the PC 30 which the general users use.

The PC 30 has a general configuration including a CPU 32, a RAM 33, a ROM 34, an HDD 38, a keyboard 36, a mouse 37, a display 39, and an NIC 35 (Network Interface Card) in the same way as the server 20.

The printer driver shared by the server 20 as described above is installed on the PC 30. The HDD 38 stores the same printer driver and the same setup information file as the server 20.

Next, a description is given of an operation of the server 20 according to the present embodiment.

First Embodiment

Figure 5:
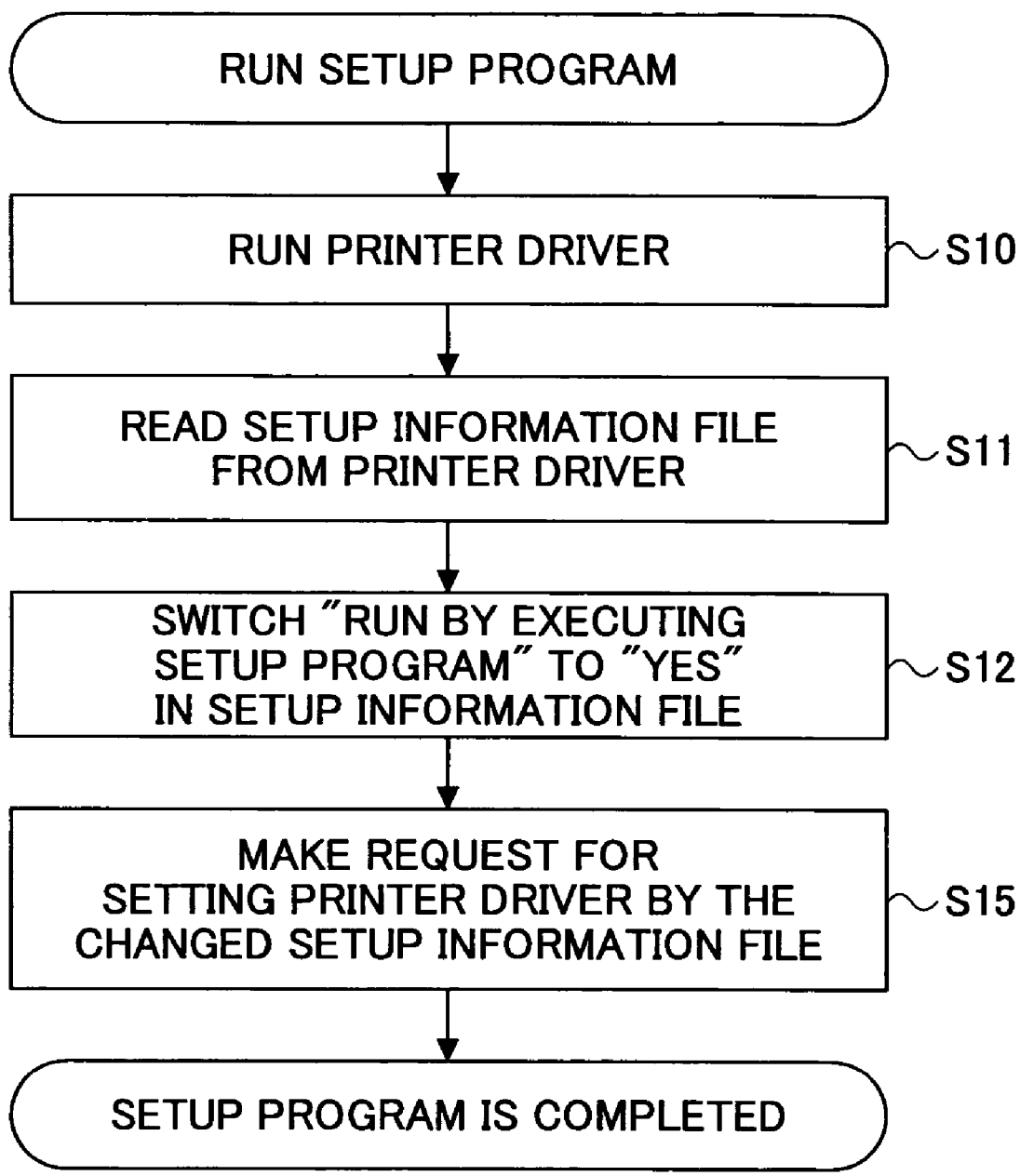
FIG. 5 is a flowchart of the server executing a setup program according to a first embodiment.

FIG. 5 is a flowchart of the server 20 executing a setup program.

The processing unit 22 of the server 20 executes the printer driver (S10). The processing unit 22 of the server 20 reads and temporarily stores the setup information file in a printer driver memory field of the RAM 23 when executing the printer driver. Next, the processing unit 22 of the server 20 reads the setup information file as a process of the printer driver (S11). In the present embodiment, the processing unit 22 of the server 20 makes a copy of the setup information file stored in the printer driver memory field and temporarily stores the copy in a setup program memory field of the RAM 23.

The processing unit 22 of the server 20 switches "Run by executing setup program" to "Yes" in the setup information file stored in the setup program memory field (S12). Next, the processing unit 22 of the server 20 sends the changed setup information file stored in the setup program memory field to the process of the printer driver and makes a request for setting up the printer driver (S15). Then, the processing unit 22 of the server 20 executing the printer driver receives the changed setup information file from the process of the setup program and stores the received setup information file in the printer driver memory field. Next, the processing unit 22 of the server 20 performs the processes described below. Further, FIGS. 7A and 7B are tables illustrating the setup information file stored in the printer driver memory field before and after executing the setup program.

FIG. 6 is a flowchart of the server 20 executing the printer driver.

The processing unit 22 of the server 20 displays the special setup screen for setting up the attribute values of the setup items on the display unit when "Run by executing setup program" and "Yes" are associated with each other and stored in the setup information file in the printer driver memory field (S30). It should be noted that the attribute values are provided for determining whether setup items are to be displayed on the default setting screen, are not to be displayed, or whether they are unchangeable, where the default setting screen is provided for setting up the attribute value of the function of the device. In the present embodiment, the setup items and the attribute values of the setup items correspond to the information such as "Lock paper feed tray" and "Yes" associated with "Lock paper feed tray", information such as "Pop-up for ID input" and "No" associated with "Pop-up for ID input" and the like. Then, the processing unit 22 of the server 20 receives the attribute values of the setup items from the input unit, and stores the received attribute values of the setup items in the setup information file in the printer driver memory field. For example, if the paper feed tray is set to be locked, the processing unit 22 of the server 20 receives the information such as "Lock paper feed tray" and "Yes" associated with "Lock paper feed tray", and stores the information in the setup information file in the printer driver memory field. FIG. 7C is a table illustrating the setup information file stored in the printer driver memory field displayed on the special setup screen, after setting up the paper feed tray to be locked.

The processing unit 22 of the server 20 displays the default setting screen indicating whether the setup items are to be displayed, are not to be displayed, or whether they are unchangeable on the display unit in response to the attribute values of the setup items stored in the setup information file in the printer driver memory field (S45). For example, if "lock paper feed tray" and "Yes" associated with "Lock paper feed tray" as the setup item and the attribute value of the setup item are stored in the setup information file in the printer driver memory field, the processing unit 22 of the server 20 sets the paper feed tray to be unchangeable by disabling (graying out) the setup item provided for selecting the paper feed tray. The paper feed tray can be set unchangeable by hiding the setup item for selecting the paper feed tray.

The processing unit 22 of the server 20 receives the attribute value of the function of the device from the input unit and stores the received attribute value in the setup information file in the printer driver memory field. Then, the processing unit 22 of the server 20 associates "run by executing setup program" with "No" and stores them in the setup information file in the printer driver memory field (S50).

The processing unit 22 of the server 20 saves the setup information file in the HDD 28, which file is temporarily stored in the printer driver memory field when the processing unit 22 of the server 20 receives a request for completing the setup from the input unit (S55). FIG. 7D is a table illustrating the setup information file in the HDD 28 after the default setting of the device driver is completed.

Then, the processing unit 22 of the server 20 reads out the attribute value of the function of the device from the setup information file in the HDD 28 and operates the printer 10 according to the read out attribute value.

According to this, the special setup screen is displayed when running the device driver by executing the setup program. On the other hand, the special setup screen is not displayed when running the device driver without executing the setup program.

Second Embodiment

In the second embodiment, the same configuration as the first embodiment is adopted except that the special setup flags are not stored in the setup information file in the HDD 28.

Figure 8:
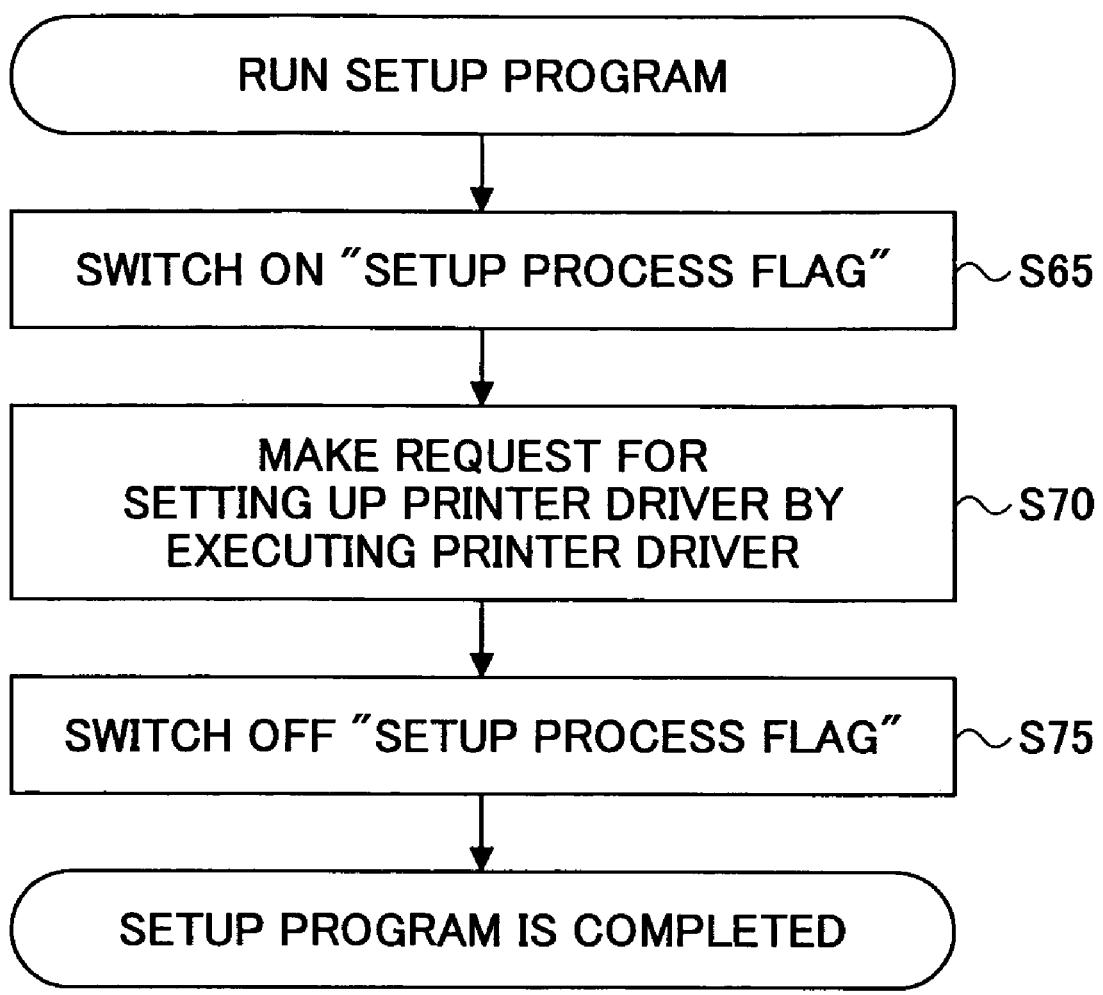
FIG. 8 is a flowchart of the server executing a setup program according to a second embodiment.

FIG. 8 is a flowchart of the server 20 executing the setup program.

The processing unit 22 of the server 20 switches ON a setup-in-process flag as a special setup flag and stores the state thereof in the HDD 28 (S65). If the setup-in-process flag is ON, the setup program is in the process of execution and the special setup of the device driver is permitted. If the setup-in-process flag is OFF, the setup program is not in the process of execution and the special setup of the device driver is prevented. Next, the processing unit 22 of the server 20 executes the printer driver as the device driver and makes a request for setting up the device driver (S70). Then, when the processing unit 22 of the server 20 receives a request for completing the execution of the setup program from the input unit, the processing unit 22 of the server 20 switches OFF the setup-in-process flag and stores the state thereof in the HDD 28 (S75).

FIG. 9 is a flowchart of the server 20 executing the printer driver.

The processing unit 22 of the server 20 displays the special setup screen for setting up the attribute values of the setup items on the display unit when the setup-in-process flag stored in the HDD 28 is ON (S85). The attribute values of the setup items are provided for determining whether the setup items are to be displayed, are not to be displayed, or whether they are to be unchangeable on the default setting screen for setting up the attribute value of the function of the device. In the present embodiment, information such as "Lock paper feed tray" and "Yes" associated with "Lock paper feed tray" and information such as "Pop-up for ID input" and "No" associated with "Pop-up for ID input" correspond to the attribute values of the setup items. The processing unit 22 of the server 20 receives the attribute values of the setup items from the input unit and stores the received attribute values of the setup items in the setup information file in the printer driver memory field. For example, when setting up the paper feed tray to be locked, the processing unit 22 of the server 20 receives the information such as "Lock paper feed tray" and "Yes" associated with "Lock paper feed tray" and stores the information in the setup information file in the printer driver memory field.

The processing unit 22 of the server 20 displays the default setting screen displaying whether the setup items are to be displayed or not to be displayed, or whether they are unchangeable in response to the attribute values of the setup items stored in the setup information file in the printer driver memory field (S105). For example, the processing unit 22 of the server 20 sets up the paper feed tray to be unchangeable by disabling (graying out) the setup items for selecting the paper feed tray when "Lock paper feed tray" and "Yes" associated with "Lock paper feed tray" are stored in the setup information file in the printer driver memory field as the attribute values of the setup items. The paper feed tray can be set unchangeable by hiding the setup items for selecting the paper feed tray.

The processing unit 22 of the server 20 receives the attribute value of the function of the device from the input unit and stores the received attribute value in the setup information file in the printer driver memory field.

When the processing unit 22 of the server 20 receives a request of completing the setup from the input unit, the processing unit 22 of the server 20 saves the received attribute value in the setup information file in the printer driver memory field (S115).

Then, the processing unit 22 of the server 20 reads out the attribute value of the function of the device from the setup information file in the HDD 28 and operates the printer 10 as the device in response to the read out attribute value.

According to this, while executing the setup program, the special setup screen is displayed when executing the device driver. When the device driver is executed without executing the setup program, the special setup screen is not displayed.

(Operation of PC)

The PC 30 has the same configuration as the server 20 except that the setup program is not installed. Since the processing unit 32 of the PC 30 does not execute the setup program, the special setup flag displaying permitting the special setup of the device driver is stored neither in the setup information file nor in the HDD 38. Accordingly, even if the processing unit 32 of the PC 30 executes the printer driver as the device driver, the special setup screen is not displayed. Therefore, the attribute values of the setup items cannot be stored in the setup information file.

Accordingly, the default setting of the printer driver can be regulated separately from the rights of the user using the computer. Moreover, the printer driver is shared by the server so that the default settings of the printer driver in the server can be directly used by the computers which the general users use when installing the printer driver in the computers which the general users use.

According to at least one embodiment of the present invention, the special setup flag is changed by the processing unit executing the predetermined setup program so as to permit a special setup of the device driver when the setup program starts being executed.

According to at least one embodiment of the present invention, the special setup flag is changed by the processing unit executing the predetermined setup program so as to prevent the special setup of the device driver when the setup program is completed.

As long as the special setup flag is stored in the storage unit, thereby permitting the special setup of the device driver, the special setup screen is displayed on the display unit so as to regulate the default setting of the printer driver separately from the rights of the users who use the computers. Further, the setup information file stores the attribute values of the setup items determining whether the setup items are displayed, are not to be displayed, or whether they are unchangeable on the default setting screen. Therefore, when installing the device driver in the computers which the general users use, the device driver stored in the server is shared so that the default setting of the device driver can be directly used by the computers which the general users use.

Moreover, the present embodiment applies the invention to a printer driver, but the present invention can be applied to device drivers of other devices.

Furthermore, the present invention is not limited to these embodiments, but variations and modifications may be made without departing from the scope of the present invention.

The present application is based on Japanese Priority Application No.2005-017844 filed on Jan. 26, 2005 with the Japanese Patent Office, the entire contents of which are hereby incorporated by reference.

What is claimed is:

1. A device driver used in a computer connected to a device, said computer comprising an input unit, a display unit, a storage unit and a processing unit, said processing unit being able to control operations of said input unit, said display unit and said storage unit, wherein said storage unit stores a setup information file and a special setup flag, said setup information file including an attribute value of a function of the device and attribute values of setup items provided for selecting whether the setup items are to be displayed, are not to be displayed, or are to be unchangeable on a default setting screen provided for setting the attribute value of the function of the device, and wherein the device driver directs the processing unit to perform the steps of:

a) displaying a special setup screen for setting up the attribute values of the setup items on the display unit when the special setup flag permitting a special setup of the device driver is stored in the storage unit, receiving the attribute values of the setup items specified by the input unit through the special setup screen, and storing the attribute values of the setup items in the setup information file;

b) reading the attribute values of the setup items by referring to the setup information file and displaying the default setting screen in which the setup items are selected to be displayed, not to be displayed, or to be unchangeable in response to the attribute values of the setup items; and c) changing the special setup flag so that the special setup flag prevents the special setup of the device driver.

2. The device driver as claimed in claim 1, wherein the special setup flag is changed by the processing unit executing a predetermined setup program so as to permit the special setup of the device driver when the setup program starts executing.

3. The device driver as claimed in claim 2, wherein the special setup flag is changed by the processing unit executing the predetermined setup program so as to prevent the special setup of the device driver when the setup program is completed.

4. A computer-readable recording medium storing a program for directing a computer to perform the steps as claimed in claim 1.

* * * * *